(12) United States Patent
Delger et al.

(10) Patent No.: US 12,726,083 B2
(45) Date of Patent: Sep. 1, 2026

(54) COAXIAL eMOTOR LUBRICATION SYSTEM AND METHOD

(71) Applicant: Magna Powertrain of America, Inc., Troy, MI (US)

(72) Inventors: Ben Delger, Warren, MI (US); Ryan Strand, Rochester Hills, MI (US); Ryan Shaw, Clarkston, MI (US)

(73) Assignee: Magna Powertrain of America, Inc.

( * ) Notice: Subject to any disclaimer, the term of this patent is extended or adjusted under 35 U.S.C. 154(b) by 219 days.

(21) Appl. No.: 18/747,617

(22) Filed: Jun. 19, 2024

(65) Prior Publication Data

US 2026/0045856 A1 Feb. 12, 2026

Related U.S. Application Data

(63) Continuation of application No. PCT/US2022/053304, filed on Dec. 19, 2022.

(60) Provisional application No. 63/293,306, filed on Dec. 23, 2021.

(51) Int. Cl.

| | |
|---|---|
| ***H02K 9/193*** | (2006.01) |
| ***H02K 5/173*** | (2006.01) |
| ***H02K 7/08*** | (2006.01) |
| ***H02K 7/116*** | (2006.01) |

(52) U.S. Cl.

CPC ........... *H02K 9/193* (2013.01); *H02K 5/1732* (2013.01); *H02K 7/083* (2013.01); *H02K 7/116* (2013.01)

(58) Field of Classification Search

CPC ...... H02K 9/193; H02K 5/1732; H02K 7/083; H02K 7/116

See application file for complete search history.

(56) References Cited

U.S. PATENT DOCUMENTS

| | | | |
|---|---|---|---|
| 7,156,195 | B2 | 1/2007 | Yamagishi et al. |
| 2009/0127954 | A1 | 5/2009 | Mogi |

(Continued)

FOREIGN PATENT DOCUMENTS

| | | | |
|---|---|---|---|
| DE | 102018111418 | A1 | 11/2019 |
| WO | 2020069744 | A1 | 4/2020 |

OTHER PUBLICATIONS

European Patent Office, Rijswijk, Netherlands, International Search Report of International Application No. PCT/EP2022/053304, Mailed Apr. 19, 2023, 3 pages.

*Primary Examiner* — Sean Gugger

(74) *Attorney, Agent, or Firm* — Dickinson Wright PLLC

(57) ABSTRACT

An electric drive module has an electric motor with a hollow rotor and a gearbox output shaft extending coaxially within the hollow rotor. Cooling medium cycles through an annular volume defined between the rotor and the shaft. A distribution housing is fixed relative to the motor housing and extends around the output shaft to define an annular chamber that receives cooling medium from an inlet of the distribution housing. The shaft and rotor rotate relative to the annular chamber, and cooling medium from the annular chamber is directed by the distribution housing into the annular volume to cool the rotor. The distribution housing may include an annular seal that engages an end face of the hollow rotor. The distribution sleeve may extend into the annular volume, or may be a two-piece structure with an outer housing and an inner sleeve.

19 Claims, 10 Drawing Sheets

(56) References Cited

U.S. PATENT DOCUMENTS

| | | | | |
|---|---|---|---|---|
| 2009/0174269 | A1* | 7/2009 | Ibaraki | F16C 33/664 310/90 |
| 2020/0282828 | A1* | 9/2020 | Suyama | B60L 15/2036 |

* cited by examiner 260
100
96
98
70
261
96
100

260
82
76
78
70
74

261
262

COAXIAL eMOTOR LUBRICATION SYSTEM AND METHOD

CROSS-REFERENCE TO RELATED APPLICATIONS

The present application is a Continuation-in-Part of co-pending PCT International Application PCT/US2022/053304, filed Dec. 19, 2022, which claims the benefit of previously filed U.S. Provisional Patent Application No. 63/293,306, filed Dec. 23, 2021, titled "COAXIAL eMOTOR LUBRICATION SYSTEM", and the entire content of each are hereby incorporated by reference in their entirety.

FIELD

The present disclosure is directed to providing improved cooling to a coaxially arranged electric motor and gearbox of an electric drive module. A cooling medium is introduced via a distribution housing between a hollow electric motor's rotor shaft and a gearbox output shaft positioned within the rotor shaft to effectively convey a cooling medium while minimizing drag. The source of the cooling medium is external to the stator and rotor of the electrical machine and is directed between the rotor and the output shaft. The present disclosure provides examples of distribution housing arrangements which will further enhance movement of the cooling medium while reducing parasitic drag losses.

BACKGROUND OF THE INVENTION

This section provides background information related to the present disclosure, which is not necessarily prior art.

The use of electric vehicles having an electric motor as a primary power source or a secondary power source are increasing due to environmental pollution and government regulations on emissions. An electric motor may include a housing, a stator disposed within the housing, and a rotor disposed to be rotatable with respect to the stator. The stator generates heat due to copper loss (wire loss) and/or core loss during operation. Heat transfer will occur in the surrounding environment of the electric motor, including inwardly into the rotor. Various techniques are currently used to cool the stator, including surrounding the exterior of the stator with a cooling jacket integrated into the housing or providing an oil spray to the end windings of the stator. An alternative technique is to use a hollow rotor construction and to direct a cooling medium to flow into the hollow void of the rotor to provide additional cooling toward the inner portion of the motor as well. This is typically easy to achieve as the hollow rotor inner diameter can be large enough to provide a large void for cooling medium to pass thru or circulate in.

In most electric vehicle applications, a gearbox is integrated with the electric motor to increase torque output and reduce motor speed to the electric vehicle's driven wheels. One arrangement is to position the output of the gear box coaxially with the center of the rotor shaft. The coaxial arrangement is beneficial as it is a space saving design easier to fit into the packaging environment of the vehicle. Such a gearbox would provide output to each of the vehicle's driven wheels via a differential unit housed in the gear box. In this arrangement one of the output shafts of the gearbox must pass thru the center of the electric motor to reach one of the driven wheels. This eliminates the ability to easily provide a cooling medium into the relatively large hollow void of the rotor shaft, as this space is now occupied by the gearbox output shaft, resulting in a small clearance or annular volume between the outer diameter of the gearbox output shaft and the inner diameter of the rotor shaft. As power requirements and duty cycles increase for larger vehicle applications, there is a need to increase cooling capability of the electric motor with a coaxial gearbox arrangement by providing an enhanced supply of the cooling medium between the output shaft and rotor shaft, while not increasing rotating drag of the overall system.

Such a cooling solution between the rotor shaft and output shaft is provided in DE102018111418A1, but includes the drawbacks of an arrangement where a sealing member is located between the housing and both the rotor shaft and the gearbox output shaft to create a large ring volume or chamber, which feeds into the annular space between the rotor shaft and output shaft with a cooling medium, in this case gearbox oil. This arrangement has the downsides of increased drag due to the dual sealing elements positioned in the housings, one which seals against a rotor shaft that operates at a high speed, which contributes to both increased drag and complexity of providing a durable seal against a high speed interface. Also, there are no features to direct, concentrate, improve, or control the flow of the cooling medium into the annular space. Without these features, the effectiveness of using the gearbox oil as a cooling medium is compromised. Therefore, a need exists to provide a lower drag, more efficient, and more effective method to directing cooling medium between the rotor and a gearbox output shaft.

SUMMARY

This section provides a general summary of the many aspects associated with the inventive concepts embodied in the teachings of the present disclosure and is not intended to be considered a complete listing of its full scope of protection nor all of its features and advantages.

It is an aspect of the present disclosure to provide a method to direct a cooling medium between the rotor and the output shaft to cool an electric motor with a coaxially located gearbox.

It is a related aspect of the present disclosure to provide a distribution housing to direct and improve effectiveness of delivery of the cooling medium between the rotor and output shaft.

It is another related aspect to configure a distribution housing which will provide minimal drag to the overall system when shafts are rotating, particularly the high speed rotor shaft.

It is another related aspect of the present disclosure for the distribution housing to receive the cooling medium from a tube and be mounted to a structure which also provides locating features of the rotor and/or output shaft to ensure proper alignment with the shafts resulting in minimal drag.

It is a related aspect of the present disclosure to include a two-piece distribution housing assembly which includes turbine blade features to improve flow of cooling medium between rotor and output shaft.

It is a related aspect of the present disclosure to include a two-piece distribution housing assembly which includes integrated sealing features between the outer housing and inner housing at the interface with the lowest speed to reduce drag produced.

It is a related aspect of the present disclosure to include a two-piece distribution housing assembly which includes oil passages equally spaced and concentric to the space between the rotor and output shaft to improve flow of cooling medium between rotor and output shaft.

It is a related aspect of the present disclosure to include a two-piece distribution housing assembly which includes a biased inner component to prevent leakage between the distribution housing and rotor shaft.

It is a related aspect to provide a solution to minimize leakage around rotating shafts without requiring physical contact with the shafts as utilized with a traditional sealing arrangement.

It is a related aspect of the present disclosure where the cooling medium is oil which is directed into the space between the rotor and output shaft and exits into the gear box while transferring heat out of the rotor shaft and surrounding electric motor components.

It is a related aspect of the present disclosure to include a distribution housing with an annular seal on its face that seals against the rotor shaft.

In accordance with these and other aspects, a cooling medium is supplied to the external extents of a distribution housing. Typically, a mechanically or electrically driven pump is utilized to provide the cooling medium with a given flow and pressure based on electric motor duty cycle cooling requirements. Cooling medium is supplied either with a tube, as shown in this disclosure, or via channels integrated into housings. Once the distribution housing receives the cooling medium, the distribution housing is used to direct and improve flow into an annular volume formed by the gap between the electric motor rotor shaft and the gearbox output shaft while contributing to minimal parasitic drag and leakage as possible. Leakage may result in the need to increase the capability of the pump to maintain the same cooling capability, and parasitic drag may be a detriment to the overall efficiency of the electric motor and gearbox system.

In the first embodiment, the distribution housing is a single piece design with a sealing element between the distribution housing and the gearbox output shaft, which rotates at a relatively low speed equivalent to the vehicle's wheel rotational speed. The distribution housing is precisely located relative to the position of the rotor and gearbox output shaft based on physical attachment to the adjacent housing via a bearing retainer to improve on potential drag and leakage. A close, but non contacting arrangement to the rotor shaft results in little to no drag and also includes an extension lip between the rotor and gearbox shaft to ensure cooling medium is directed into the annular volume with minimal fluid leakage, and facilitates the movement of the cooling medium along the length of the rotor shaft.

In a second embodiment, the distribution housing is a two-piece arrangement, which has an inner portion, fixed with rotation to the gearbox output shaft, and an outer portion, which is fixed to the stationary bearing retainer. An integrated sealing arrangement is provided between the outer diameter of the inner portion and the inner diameter of the outer portion. This is an improvement when compared to a sealing solution that is against the rotor shaft, as the associated speeds and parasitic drag will be less. Also, incorporating the sealing into existing part material reduces the need for an additional component. The inner portion is further closely positioned to the inner portion of the rotor and an extension lip extends into the annular volume between the rotor and gearbox output shaft to ensure cooling medium is directed into the annular volume with minimal fluid leakage, and facilitates the movement of the cooling medium along the length of the rotor shaft. These features ensure the cooling medium continues down the gap as intended instead of reversing direction to spill out of the entrance, without the need for any sealing device, and without contacting the rotor shaft increasing parasitic drag. Further improving the movement of oil along the length of the rotor shaft are turbine features of the inner portion in combination with internal channels formed into the inner housing which interact with the cooling medium being supplied from the outer housing portion. Because the turbine feature acts as a secondary pump, these features further influence and accelerate the movement of cooling medium being delivered along the length of the rotor shaft, thereby improving heat transfer capabilities and cooling. This turbine feature can potentially result in the use of a smaller cooling medium supply pump.

In a third embodiment, the distribution housing is again a two-piece arrangement, which has an outer portion that is fixed to the stationary housing. The inner portion is this embodiment is biased to be positioned against the rotor shaft, but tabbed with the outer portion to ensure rotation of the inner portion does not occur relative to the bearing retainer or cover housing. An integrated sealing arrangement is again provided between the outer diameter of the inner portion and the inner diameter of the outer portion, but in this embodiment the seal is static as there is no rotation occurring on its interface, with only a small amount of axial movement during installation. The inner portion is located radially inward relative to the outer portion and the output shaft operates as a supporting journal for a limited length of the inner portion of the distribution housing. The inner portion that is biased against the rotor provides sealing to ensure cooling medium is directed into the annular volume with minimal fluid leakage while providing the least amount of parasitic drag as possible. A plurality of holes or nozzles are angled and positioned in the inner portion to squirt or propel cooling medium down the gap along the length of the rotor shaft, thereby improving heat transfer capabilities and cooling. The usage of multiple holes whose diameter, location, and position can be adjusted can result in a turbulent flow down the annular volume improving heat transfer.

In a fourth embodiment, the distribution housing includes an annular seal on a face of the distribution housing facing an end face of the hollow rotor, wherein the annular seal is compressed against the end face of the hollow rotor, and the hollow rotor rotates relative to the annular seal. The distribution housing is precisely located relative to the position of the rotor and gearbox output shaft based on physical attachment to the adjacent housing via a bearing retainer to improve on potential drag and leakage. A tuned-in contacting arrangement to the rotor shaft results in reduced drag while providing sufficient sealing to ensure cooling medium is directed into the annular volume with minimal fluid leakage, and facilitates the movement of the cooling medium along the length of the rotor shaft.

In one aspect, an electric drive module including an electric motor coaxially arranged with an output of a gearbox is provided, the electric drive module comprising: an electric motor having a rotor, the rotor being hollow and rotatable relative to a motor housing and a stator of the electric motor; a gearbox having an output shaft concentric with the rotor and disposed radially within the hollow rotor; an annular volume formed radially between the hollow rotor and the gearbox output shaft; a cooling medium distributed through electric drive module, wherein the cooling medium flows through the annular volume and transfers heat away from the electric motor via contact with the hollow rotor; and a distribution housing that receives the cooling medium during distribution thereof, wherein the distribution housing directs the cooling medium from an inlet of the distribution housing and into the annular volume; wherein the distribution housing is coaxial with the rotor and the output shaft and is mounted to structure of the electric motor that provides locating features to the output shaft and the rotor to provide minimal fluid and drag losses.

In another aspect, a method of providing cooling medium within one of the electric drive modules described above is provided, the method comprising the steps of: introducing cooling medium via the inlet into the distribution housing; directing the cooling medium from the distribution housing into and through the annular volume away from the distribution housing and toward the gearbox; rotating the rotor relative to the distribution housing; rotating the output shaft relative to the rotor; transferring heat from the rotor to the cooling medium being directed through the annular volume; and cooling the rotor.

These and other features and advantages of the present invention will become more readily appreciated when considered in connection with the following detailed description and associated drawings.

BRIEF DESCRIPTION OF THE DRAWINGS

The drawings described herein are for illustrative purposes only of selected embodiments and are not intended to limit the scope of the present disclosure. The inventive concepts associated with the present disclosure will be more readily understood by reference to the following description in combination with the accompanying drawings wherein.

DETAILED DESCRIPTION

Example embodiments will now be described more fully with reference to the accompanying drawings. In general, each embodiment is directed to usage in an electric drive module comprising of an electric motor which provides power to a coaxially arranged gearbox positioned at one end of the electric motor. The electric motor includes a stator fixed mounted into the housing surrounding the electric motor and a rotor assembly positioned radially inward of the stator. The rotor assembly includes the rotor laminations, magnets, and a rotor shaft. The coaxially arranged gearbox is positioned inline and provides an input and output which is concentric with the center of the electric motor and is mounted on the output side of the electric motor rotor shaft. Power is transmitted from a gear feature formed on the rotor shaft and into an arrangement of meshed gears to provide a speed reducing ratio. A differential is driven by these meshed arrangement of gears which further drives a pair of gearbox output shafts. These pair of gearbox output shafts drive a left and right wheel of the electric vehicle. As the gearbox output, and more specifically the differential, is positioned concentric with the rotor shaft and electric motor, one of the gearbox output shafts must pass back through the center of the rotor shaft to reach one wheel of the electric vehicle. Therefore, the gearbox output shaft is a solid shaft of a given diameter and is surrounded by the hollow electric motor rotor shaft. Both are sized based on packaging and torque transfer requirements. As both shafts rotate at a different speed based on the gearbox ratio, clearance must be provided between them. It is in this clearance a cooling medium will be directed, traveling along the length of the rotor shaft, to remove heat from the rotor which has been heated by energizing the windings in the stator.

Figure 1:
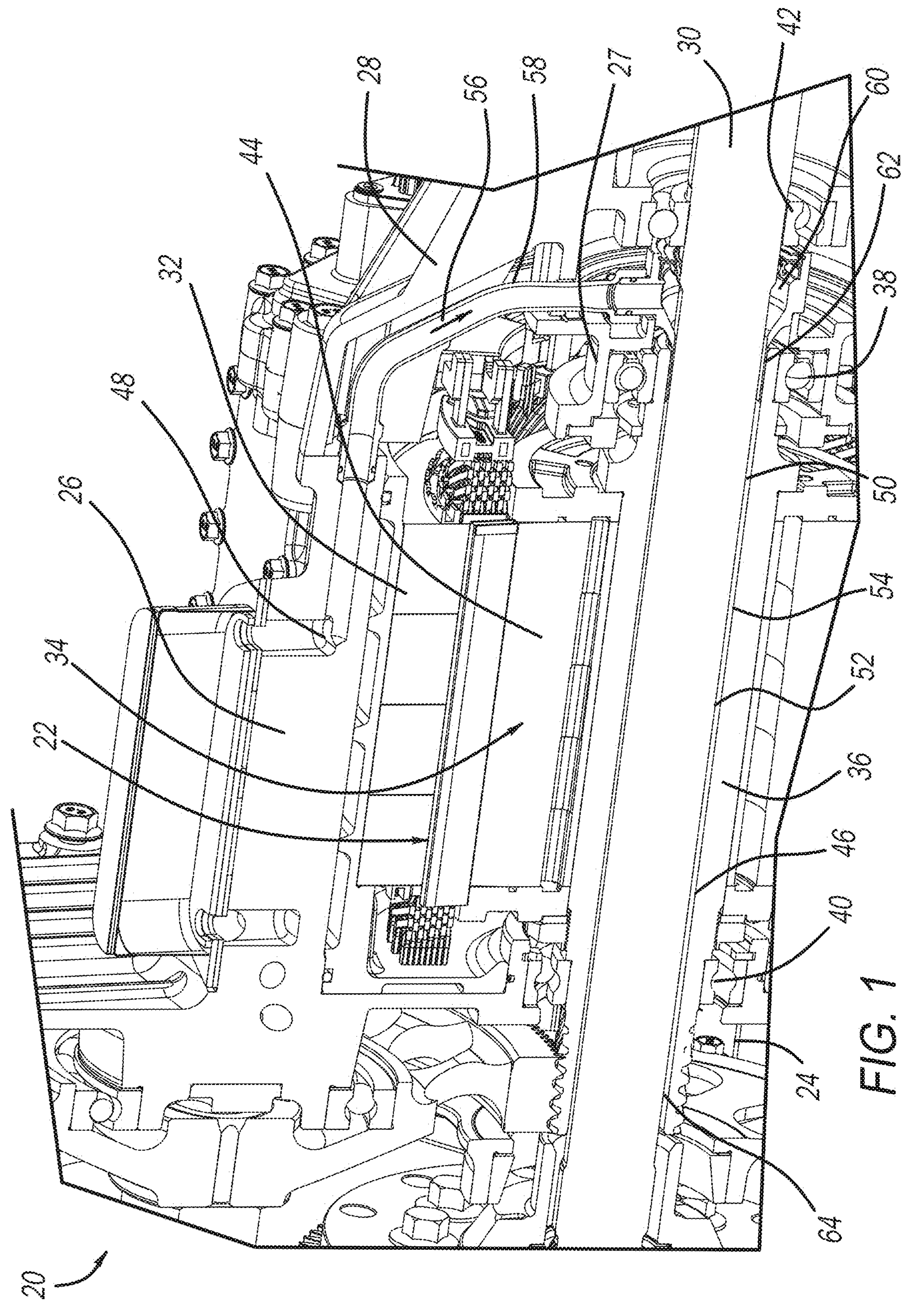
FIG. 1 is a cross sectional view of the electric drive module in accordance with the present disclosure.

Referring to FIG. 1 a cross section of a portion of the electric drive module 20 is shown, with particular focus on the electric motor 22 and nearby surrounding components. The electric drive module 20 example shown here has a gearbox housing 24, electric motor housing 26, and cover housing 28. The gearbox housing 24 contains a gearset arrangement (not fully shown) to provide a speed reducing geartrain driving a differential and a pair of gearbox output shafts. One of the gearbox output shafts 30 can be seen in FIG. 1. The gearbox output shaft 30 rotates in response to actuation of the electric motor 22 to provide motive power to wheels of the vehicle that are connected to the output shafts 30. The gearbox housing 24 mounts to one side of the electric motor housing 26. Within the electric motor housing 26, a stator 32 of the electric motor 22 is mounted in a fixed position (shown in a radially outer region of the motor 22). Radially inward of the stator 22 is the rotor assembly 34, which is configured to rotate relative to the fixed stator 22. The rotor assembly 34 includes a rotor shaft 36, lamination stack 44, magnets and other components as typically found in a permanent magnet electric machine. A cover housing 28 is attached to the motor housing 26 to further enclose the electric motor 22. The rotor shaft 36 is supported and precisely positioned by bearings 38, 40 positioned at each end received by the electric motor housing 26 and bearing retainer 27. Bearing retainer 27 is mounted to cover housing 28 in a manner to ensure alignment between previously described bearings, shafts and housings. One of the pairs of gearbox output shafts 30 (as shown in FIG. 1) passes through the center of rotor shaft 36 and is supported at a first end by a bearing 42 posited into cover 28, and at a second end by the differential assembly (out of view to the left of FIG. 1) towards the gearbox housing 24 end of the electric drive module 20. The bearing arrangement between rotor shaft 36 and gearbox output shaft 38 ensures the concentric position relative to each other.

Continuing to refer to FIG. 1, because a constant radial distance 46 is maintained between the output shaft 30 and the rotor shaft 36, an annular volume 50 is created between the gearbox shaft outer diameter 52 and the rotor shaft inner diameter 54, along the length of rotor shaft 36. It is this annular volume 50 that is provided and fed with a cooling medium 56 to remove heat that is conducted and/or otherwise transferred to the rotor shaft 36 due to excitation of the electric motor 22. In this embodiment example, cooling medium 56 is pressurized by a pump (not shown) and provided from a cooling medium source 48 that is located in the electric motor housing 26. A supply tube 58 is used to transfer the cooling medium 56 from the electric motor housing 26 and into the distribution housing 60. Optionally, channels may be formed directly in the electric motor housing 26 or cover housing 28 to achieve a similar flow path without the use of a separate tube. In one aspect, the tube 58 ma extend through the cover housing 28 and join with a channel or passageway formed in the motor housing 26. For the purposes of discussion, the tube 58 will be referenced. In this example, the cooling medium is the same oil that is utilized in the gearbox, as the cooling medium will exit into the gearbox housing 24. This use of the same oil provides the simplest arrangement for fluid circulation. As an alternative, water-based cooling such as ethylene glycol could be used in combination with fluid path modifications so that the cooling medium 56 will not mix with the gearbox oil. The distribution housing 60, disposed at the end of tube 58, directs the cooling medium into the annular volume 50. As the cooling medium 56, oil in this case, is provided with a pressure, the cooling medium 56 will continue from the fluid inlet portion 62 of the rotor shaft 36 and travel between the rotor shaft 36 and gearbox output shaft 30 towards the gearbox housing 24, and will exit at the fluid outlet 64. The cooling medium 56 will then be used to lubricate the components within the gearbox, suctioned by a pump from a gearbox sump, and pumped to a heat exchanger to remove heat from cooling medium. The cooling medium will be recirculated in the previously described route to further and continually cool the rotor.

Figure 2:
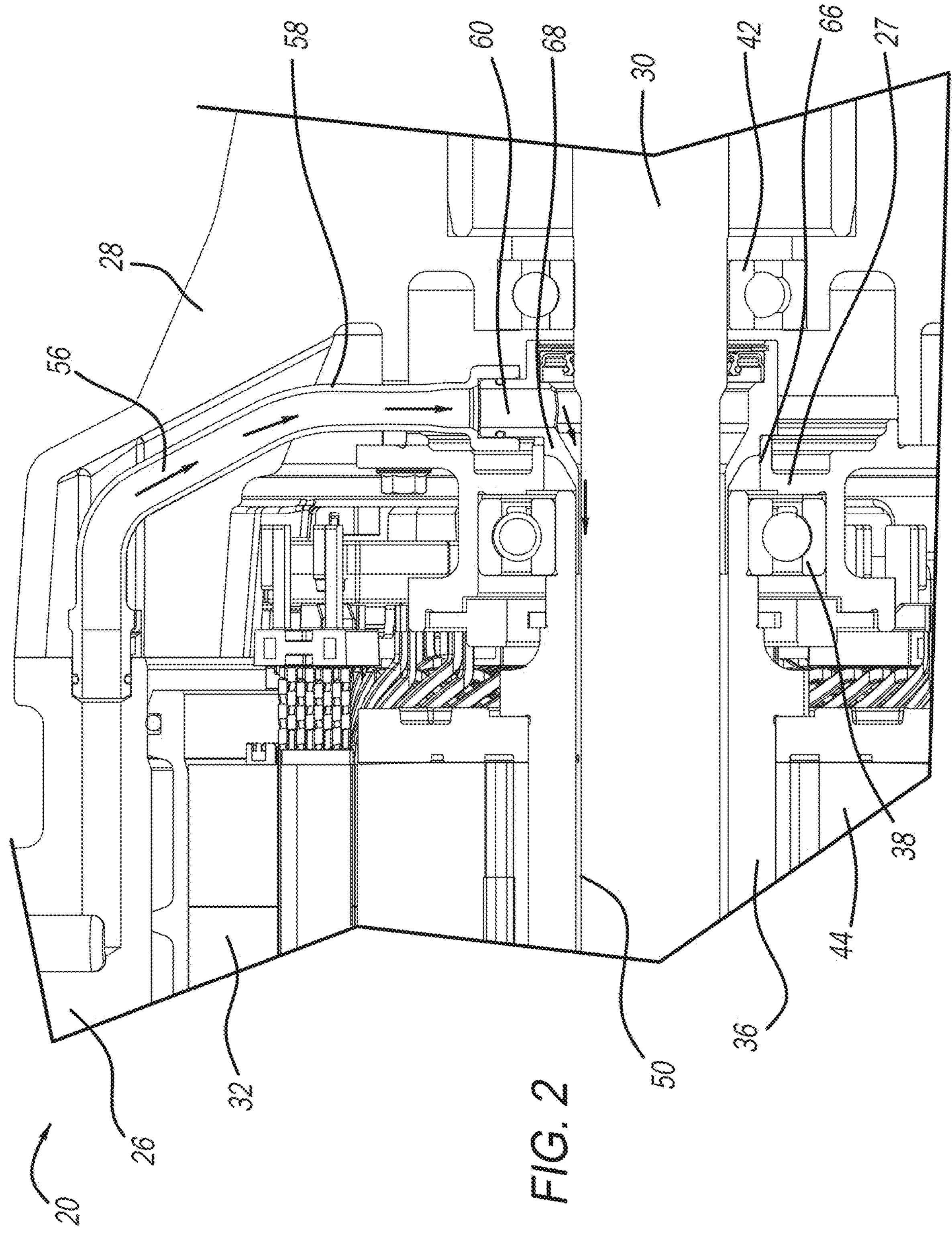
FIG. 2 is a cross sectional view of the cooling medium path to the distribution housing and into the annular volume in accordance with the present disclosure.

Referring now to FIG. 2, a cross section focused on the location of cooling medium distribution housing 60 is provided, illustrating and how housing 60 is positioned relative to rotor shaft 36 and gearbox output shaft 30, previously shown in FIG. 1. As rotor shaft 36 and gearbox output shaft 30 are supported and precisely located by bearings 38 and 42 (these bearing at the cover housing 28 end of the electric drive module 20 and on opposite axial sides of housing 60), distribution housing 60 can be precisely positioned concentric to each of these shafts. This positioning of the housing 60 is achieved by providing a bore 66 in bearing retainer 27 which receives outer diameter 68 of distribution housing 60. Distribution housing 60 is fixed to bearing retainer 27 via fasteners not shown in this view but will be described in later figures. Ensuring the concentricity of distribution housing 60 relative to rotor shaft 36 and gearbox output shaft 30 ensures the further described features of distribution housing 60 that successfully provide transfer of cooling medium 56 into annular volume 50 effectively and efficiently.

Figure 3:
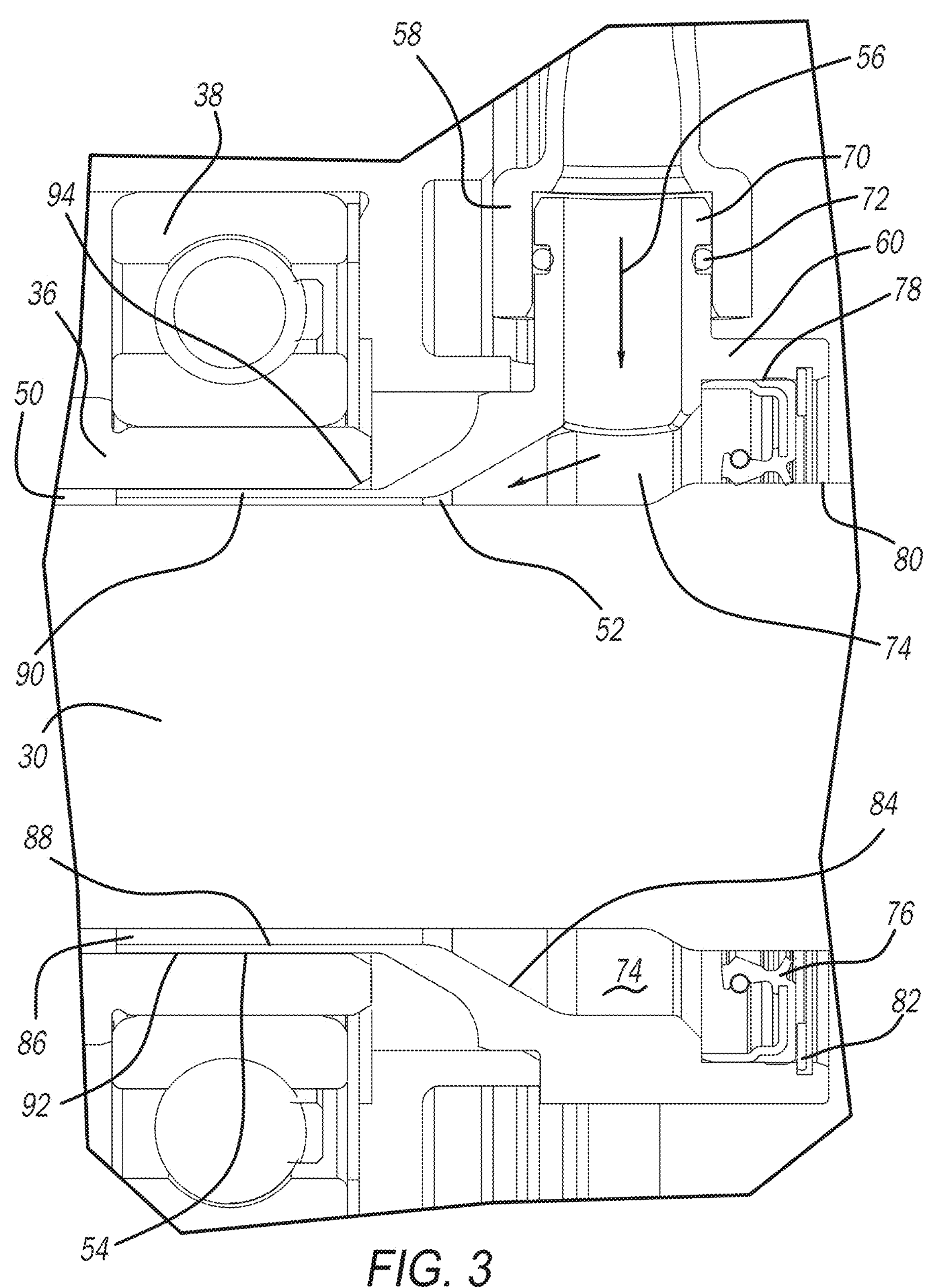
FIG. 3 is a cross sectional view including the first embodiment of the distribution housing.

Referring to FIG. 3, a further detailed view of distribution housing 60 is shown, with small clearances where cooling medium 56 feeds into annular volume 50 being illustrated, further described below. Cooling medium 56 flows through supply tube 58 under pressure. Supply tube 58 is fitted over inlet 70 of distribution housing 60, with o-ring 72 providing a tightly sealed connection. Cooling medium 56 then enters further into distribution housing 60 and into chamber 74. Chamber 74 is sealed via a lip seal 76 which is pressed into bore 78 of distribution housing 60. Lip seal 76 seals against a journal surface 80 of gearbox output shaft 30. A snap ring 82 retains seal into bore 78 and controls its axial position. On the opposite side of chamber 74 from lip seal 76, a conical wall 84 of distribution housing 60 is provided to funnel cooling medium 56 towards a small gap 86. Gap 86 is maintained between the inner bore 88 of distribution housing 60 around the entire circumference (outer diameter 52) of gearbox output shaft 30 to provide an annular path form chamber 74 to transmit cooling medium 56 towards annular volume 50. Distribution housing 60 includes an extension lip 90 which projects into the annular volume 50, positioned to maintain gap 86 between the output shaft 30 and inner bore 88 while also providing clearance 92 to the inner surface 54 of rotor shaft 36. The extension lip 90 of distribution housing 20 extends beyond the edge 94 of rotor shaft 36 and ensures cooling medium 56 will be delivered into annular volume 50 towards outlet 64 (FIG. 1) with minimal fluid leakage even without a tight seal. Additionally, because clearance 92 is maintained to rotor shaft 36, significantly less drag will occur when compared to a traditional lip seal used to seal in the same position. The above describes features, such as the chambers, passageways, seals, clearances, diameters, etc. are each annular in nature and typically extend circumferentially fully around the rotor shaft 36. It will appreciated that the clearance 92 between the rotor shaft 36 and the extension lip 90 is very small. It will be appreciated that the illustration of FIG. 3 includes a clearance at 92. Thus, while not a seal, leakage may be minimized at 92 while also substantially reducing drag.

Figure 4:
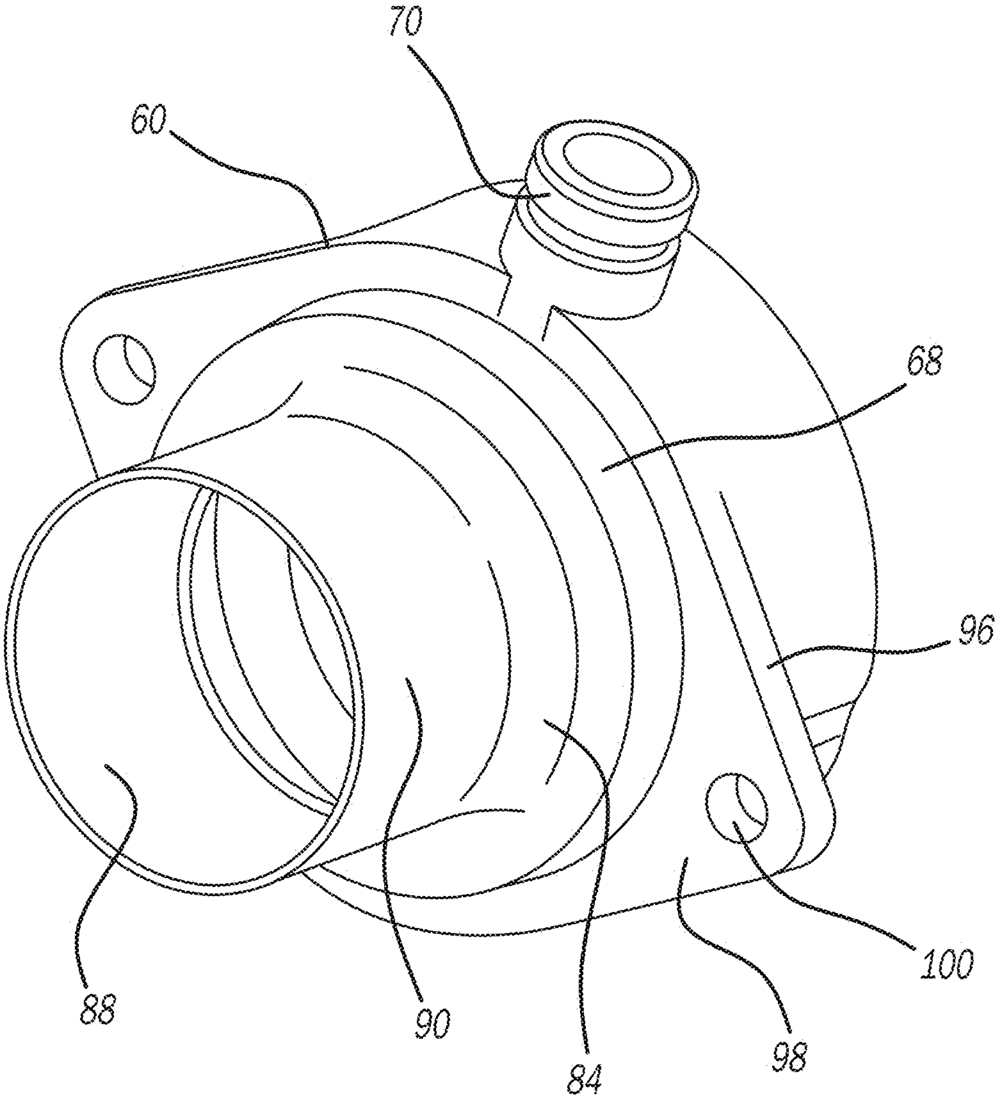
FIG. 4 is an isometric view of the first embodiment of the distribution housing.

FIG. 4 represents an isometric view of distribution housing 60 as viewed from the gearbox side of electric drive module 20. An improved view of outer diameter 68 which serves as a pilot locating feature received by bore 66 in bearing retainer 27 can be seen. Flange 96, extending from outer edge of distribution housing 60 provides a mounting face 98 and through holes 100 to pass a fastener (not shown) to fix distribution housing 20 to bearing retainer 27 from back of flange 96 as oriented. These features ensure positional alignment and concentricity with rotor shaft 36 and gearbox output shaft 30. Previously described extension lip 90 extending from conical wall 84 can also be clearly seen.

Figure 5:
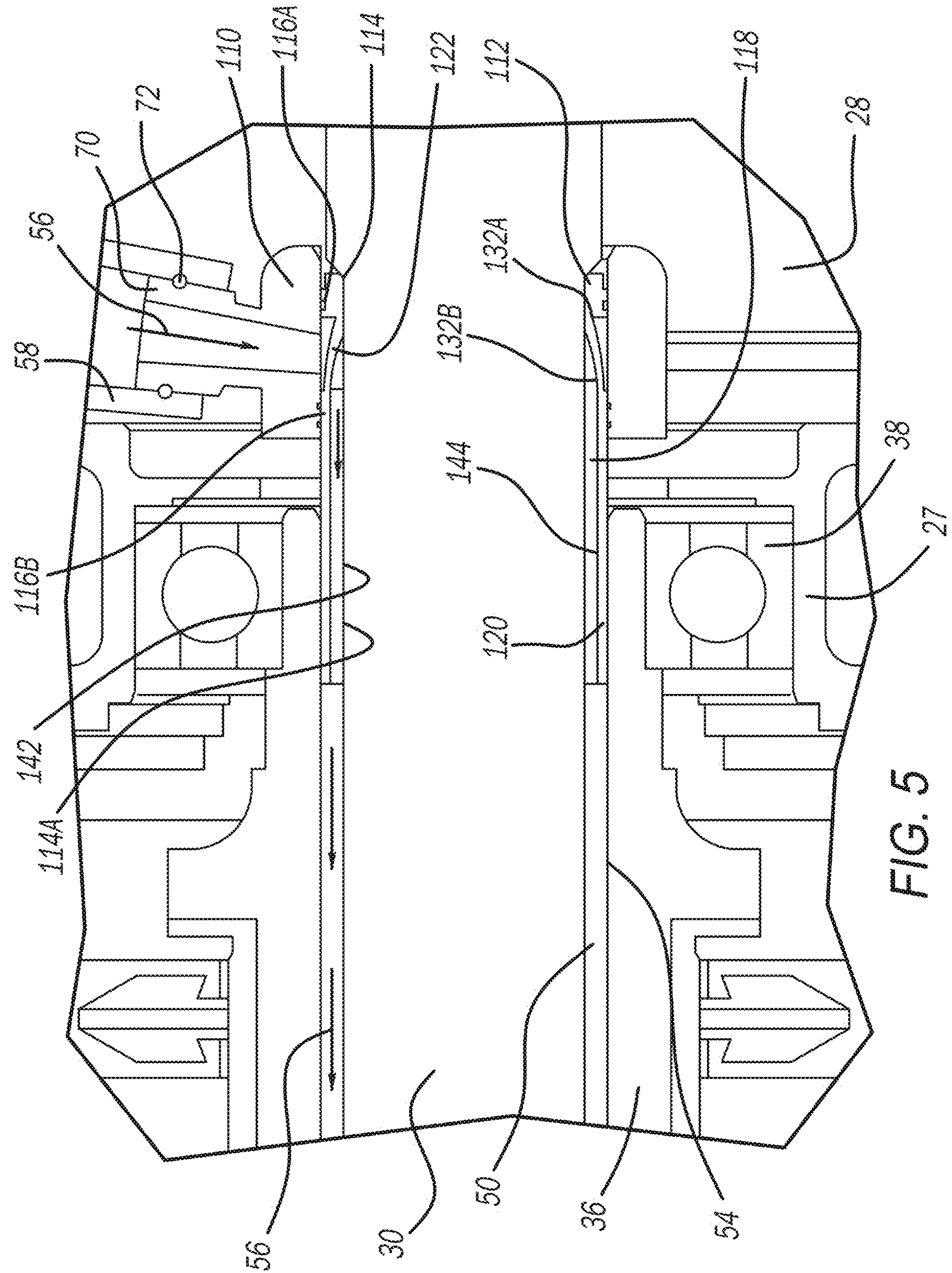
FIG. 5 is a cross sectional view of the second distribution housing embodiment with turbine pumping feature.

FIG. 5 is a cross section of a second embodiment of the present disclosure. Similar to the first embodiment, cooling medium 56 is directed towards annular gap 50 between rotor 36 and gearbox output shaft 30. In this embodiment the distribution housing is now a two piece design (including outer distribution housing 110 and inner distribution sleeve 112). The outer distribution housing 110 receives cooling medium 56 provided by supply tube 58 at inlet 70 (similar to housing 60 previously described). The interface between supply tube 58 and inlet 70 is also sealed by an o-ring 72. The outer distribution housing 110 is mounted to either cover housing 28 or bearing retainer 27, therefore being stationary relative to gearbox output shaft 30. Inner distribution sleeve 112 is used to direct and deliver cooling medium 56 into annular volume 50. Inner distribution sleeve 112 is mounted directly to gearbox output shaft 30 at position 114 via a press fit. This press-fit direct mounting results in inner distribution sleeve 112 rotating with gearbox output shaft 30, and relative to fixed in place housing 110. Inner distribution sleeve 112 is further supported by gearbox output shaft 30 along is axial length at position 114. Two sealing interfaces 116*a*, 116*b* are provided between the inner distribution sleeve 112 and the outer distribution housing 110, and ensure cooling medium 56 is transferred to annular volume 50 with minimal or no leakage. Sealing interface 116*a* is located at an outboard position away from annular volume 50, while sealing interface 116*b* is located towards annular volume 50. The sealing interfaces 116*a*, 116*b* are designed to integrate the sealing lip features (element 76 in the previously described embodiment of FIG. 3) into either the inner distribution sleeve 112 or outer distribution housing 110. This arrangement eliminates an additional component (the sealing lip 76) and also provides for a radially compact sealing solution. Arranging the sealing interface between the outer distribution housing 110 and the inner distribution sleeve 112, which rotates at gearbox output shaft 30 speed, results in the lowest parasitic drag and also allows the potential for creating the sealing interface of sealing interfaces 116*a*, 116*b* using the same polymer material that the housing 110 or sleeve 112 is constructed from. Because the inner distribution sleeve 112 is fixed and located via the gearbox output shaft 30, a small clearance channel 118 is formed to maintain a path for cooling medium 56 to pass thru between extended tube portion 120 of inner distribution sleeve 112 and the outer diameter 52 of shaft 30. Also, extending the tube portion 120 into the inner bore 54 of rotor shaft 36 results in minimal fluid leakage even without a tight seal at this location, directing cooling medium 56 towards outlet 64 without additional drag.

Continuing to refer to FIG. 5, axially between sealing surfaces 116*a* and 116*b*, a feature is formed in the inner distribution sleeve 112 that provides additional pumping action of cooling medium 56. A plurality of turbine blades 122 are formed into inner distribution sleeve 112 to interact with cooling medium 56 traveling through inlet 70 an entering between sealing surfaces 116*a* and 116*b*. As the inner distribution sleeve 112 is rotating with the gearbox output shaft 30, turbine blades 122 add a pumping action to cooling medium 56, increasing flow into channel 118 that is between inner distribution sleeve 112 and gearbox output shaft 30. This increased velocity of cooling medium 56 improves heat transfer away from rotor shaft 36. As in the previous embodiment, cooling medium 56 will continue towards outlet 64 and return to the gearbox sump to be recirculated.

Figure 6:
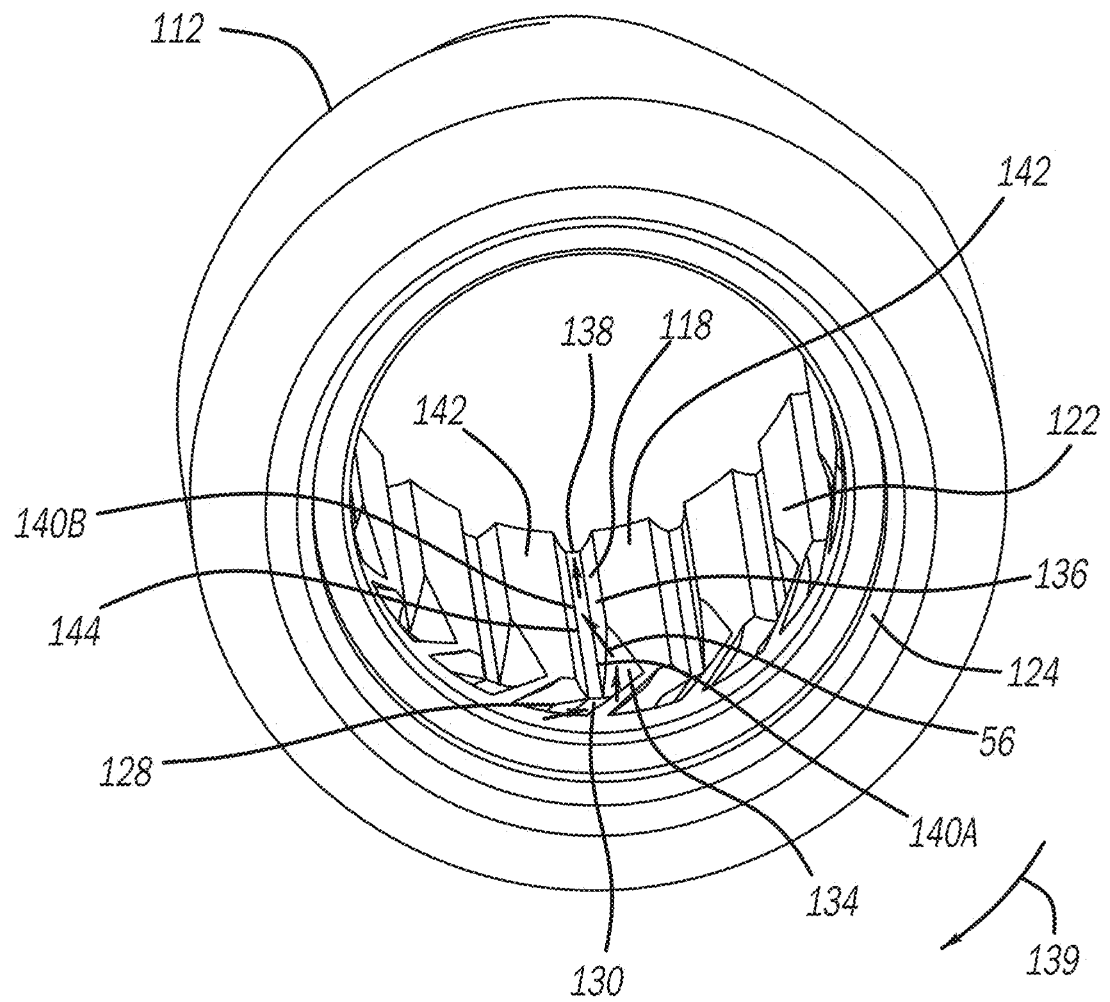
FIG. 6 is an isometric view of the inner distribution sleeve with turbine pumping feature.

FIG. 6 is an inside view of inner distribution sleeve 112 of the second embodiment as viewed from the cover housing 28 side of the electric drive module. In this view turbine blades 122, and the channel 118 cooling medium 56 is fed into by the array of circumferentially arranged turbine blades 122, can be better seen. Channel 118 provides a space radially outward from gearbox output shaft outer surface 52 for cooling medium 56 to travel towards annular volume 50. Inner distribution sleeve 112 is rotatably and axially fixed to gearbox output shaft 30, as described above, via a press fit between bore 124 and gearbox output shaft 30 at position 114. This press-fit results in inner distribution sleeve 112 rotating together with the gearbox output shaft 30. In one aspect, when electric drive module 20 is rotating in the vehicle forward direction, inner distribution sleeve 112 will rotate with output shaft 30 in a clockwise 139 direction. Because this is the vehicle operating direction where the highest power is developed by electric motor assembly 22, the need for a higher level of cooling is required. Therefore, turbine blades 122 will be most effective and useful in pumping cooling medium 56 into annular volume 50 when the vehicle is operating in a forward direction. Multiple turbine blades 122 are positioned equidistant to each other and circumferentially about the inner diameter of inner distribution sleeve 112. Cooling medium 56 is forced towards the blade inlet 128 as it is directed between sealing surfaces 116*a* and 116*b* from the outside of inner distribution sleeve 112 (after being fed inlet tube 70 of outer housing 110). Note, the behavior of cooling medium 56 as it interacts with turbine blades 122 will now be described fully in detail for using one blade as an example, but it should be understood the phenomena would occur to each of the turbine blades 122 in a similar manner arranged about the inner distribution sleeve 122. As inner distribution sleeve 112 and therefore turbine blades 122 rotate, cooling medium 56 exiting outer housing inlet 70 is met by the leading edge 130 of turbine blade 122 after being received in blade inlet 128. On either side of turbine blades 122, faces 132A and 132B, best seen in FIG. 5, ensure cooling medium is directed to blade face 134 where a portion of cooling medium 56 flows above blade face 134. Blade face 134 is angled, both radially inward as well as in a direction to direct cooling medium 56 towards channel 118. A chamfer 136 further directs cooling medium 56 from the surface of blade face 134 and into channel 118. Chamfer 136 is tilted towards channel 118 to extend from journal support surface 142 to channel wall 140A. In one aspect, the chamfer 136 may be tapered with a wider portion on the turbine blade 122 end of inner distribution sleeve 112 and a narrower portion towards the outlet end 138 of channel 118. Opposite and across channel 118 in the direction of rotation, channel wall 140B extends radially inward from channel 118 towards journal support surface 142. Channel wall 140A and channel wall 140B are positioned generally parallel to each other with a bottom surface 144 further creating channel 118. In operation of the second embodiment, cooling medium 56 will enter turbine blades 122, which will push cooling medium 56 towards and through channel 118, further directed by tilted and tapering chamfer 136 traveling between surface 144, walls 140A/140B and gearbox output shaft outer surface, and into annular volume 50 downstream from outlet end 138. The cross-section of FIG. 5 illustrates channels 118 both above and below and the output shaft 30, but it will be appreciated that a plurality of channels 118 are disposed around the circumference of the sleeve 112 and the shaft 30. Journal support surface 142 may be in the form of a concave curved surface that corresponds to the outer diameter of the shaft 30, with the height of the channel 118 being defined between the journal support surface 142 and the bottom surface 144 of the channel 118. In aspect, a small clearance is provided between an outer diameter of sleeve 112 and inner surface 54 of rotor shaft 56 to minimize drag and leakage, similar to clearance 92 of FIG. 3.

Figure 7:
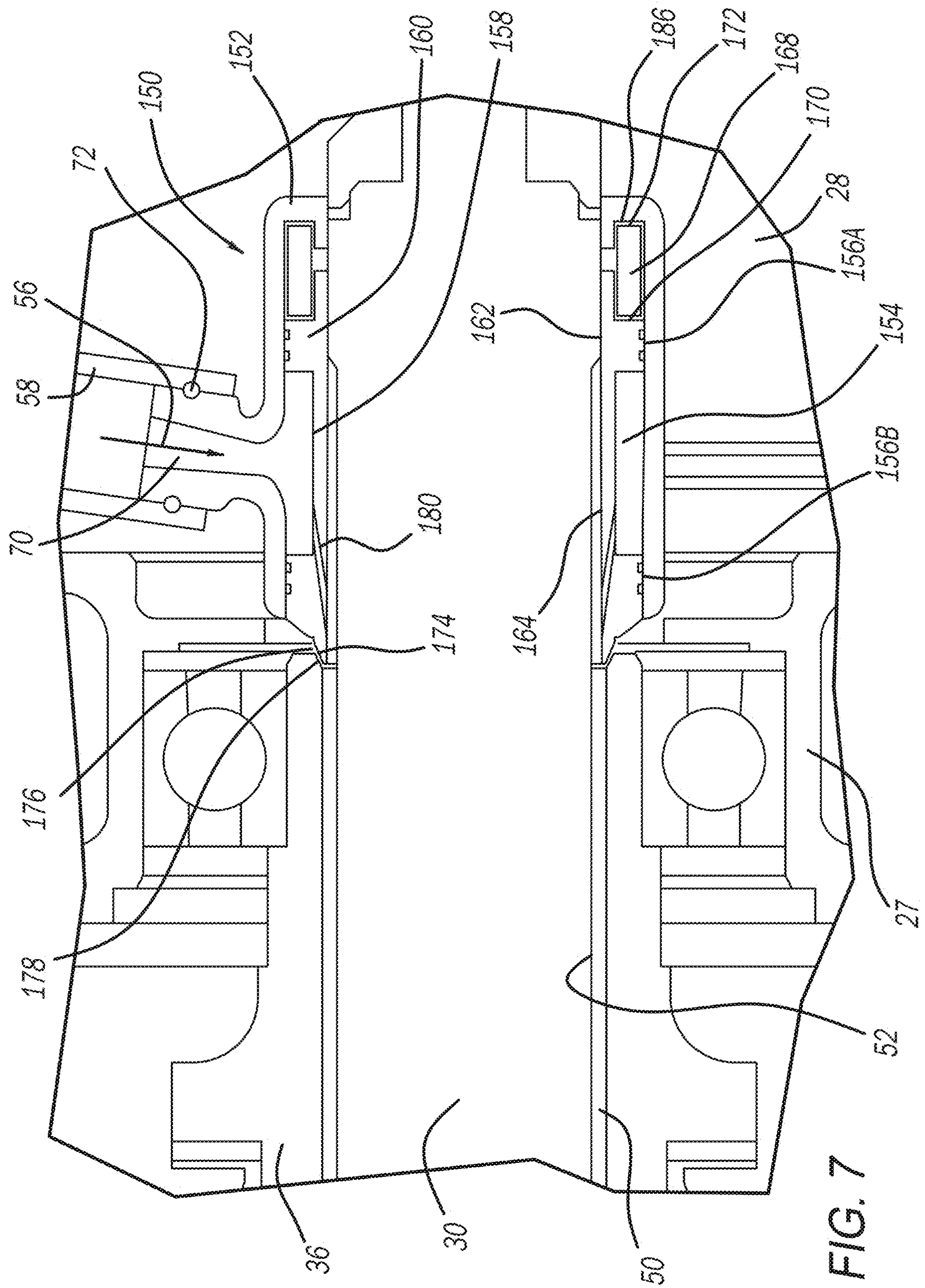
FIG. 7 is a cross sectional view of the third distribution housing embodiment with nozzle feed feature.

FIG. 7 is a cross section of a third embodiment of the present disclosure. Similar to the first and second embodiment, cooling medium 56 is directed towards annular volume 50 between rotor 36 and gearbox output shaft 30. Similar to the second embodiment, distribution housing 150 is a two-piece design. The outer distribution housing 152 continues to receive cooling medium 56 provided by supply tube 58 at an inlet 70 and is fixed in place. The interface between supply tube 58 and inlet 70 is similarly sealed by an o-ring 72. The outer distribution housing 152 can be mounted to either cover housing 28 or bearing retainer 27, therefore stationary relative to gearbox output shaft 30. An annular chamber 154 is created between sealing interfaces 156*a*, 156*b* and around outer diameter 158 of inner distribution sleeve 160. Sealing interface 156*a* is located at an outboard position towards cover 28, while sealing interface 156*b* is located towards annular volume 50. The sealing interfaces 156*a*, 156*b* are designed to integrate the sealing lip features into the inner distribution sleeve 160. This eliminates an additional component and provides for a radially compact sealing solution. Inner distribution sleeve 160 tightly surrounds gearbox output shaft 30 at journal 162, but is not press fit or fixed to the gearbox output shaft 30 as seen in the second embodiment. The interface between journal 162 and bore 164 of inner sleeve 160 provides support and alignment of the distribution housing assembly 150 relative to the gearbox output shaft 30. Inner distribution sleeve 160 is received by outer distribution housing 152 and anti-rotation feature 166 (FIGS. 8 and 9) prevents relative rotation between inner distribution sleeve 160 and outer distribution housing 152. Anti-rotation feature 166 will be further described in FIG. 8. Inner distribution sleeve 160 is received into the bore/cavity of the outer distribution housing 152. A biasing element 168, which in this non limiting example is a wave spring, is positioned between shoulder 170 of inner distribution sleeve 160 and spring pocket 172 of the outer distribution housing 152. The biasing element 168 is used to move inner distribution sleeve 160 towards rotor shaft 36. Prior to assembly, inner distribution sleeve 160, and in particular conical face 174, will be in an extended position beyond vertical face 176 of outer distribution housing 152 because biasing element 168 will be fully extended. When the overall distribution housing assembly 150 is installed, contact with the end of rotor shaft 36 will occur resulting in contact between chamfer surface 178 of rotor shaft 36 and conical face 174 of inner distribution sleeve 160. Contact of the inner distribution sleeve 160 against rotor shaft 36 applies an axial force on sleeve 160 and reduces the extended length of biasing element 168. In the installed position, as shown in FIG. 7, the inner distribution sleeve 160 is displaced further inside outer distribution housing 152, so conical face 174 is shown pushed and retracted into housing 152 from its previous extended/uninstalled position. Biasing element 168 ensures a small force is applied on rotor shaft 36 from inner distribution sleeve 160, resulting in continuous contact between conical sealing face 174 and chamfer 178. This low-force contact ensures that minimal leakage of cooling medium 56 occurs in this area, while providing a simple and low drag sealing solution between rotating rotor shaft 36 and the non-rotating inner distribution sleeve 160. This arrangement results in sealing surfaces 156*a* and 156*b* operating without any rotational speed difference relative to the housing 152, instead being a relatively static sealing solution, because only minimal axial movement occurs between the inner distribution sleeve 160 and outer distribution housing 152, which axial movement only occurs during the assembly process as the inner sleeve 160 is forced into housing 152.

Figure 8:
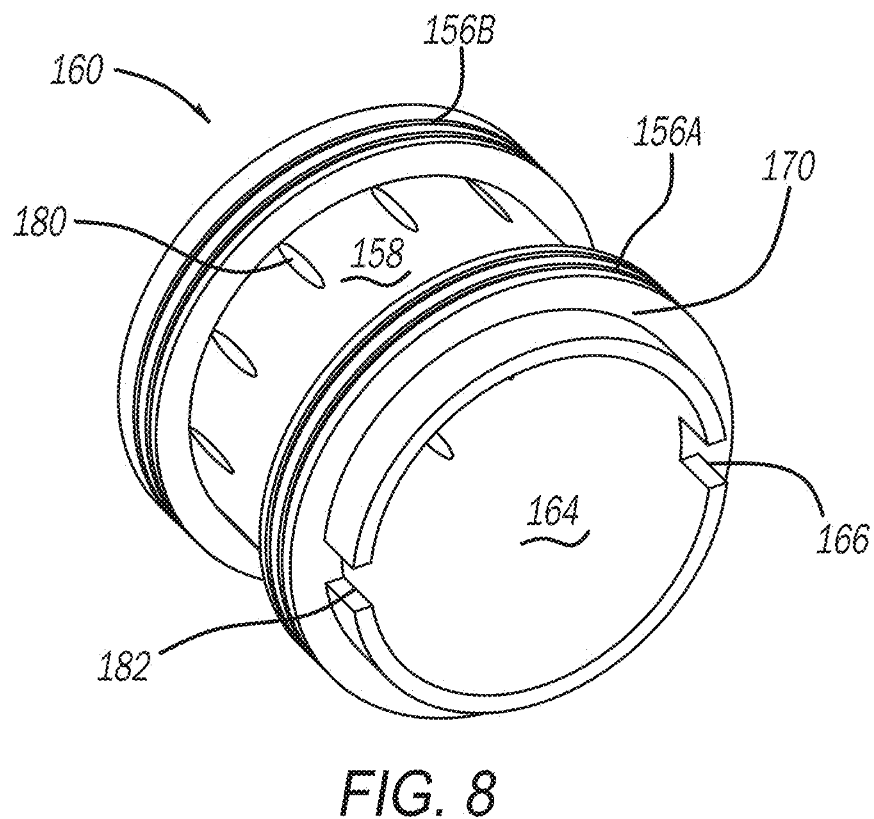
FIG. 8 is an isometric view of the inner distribution sleeve with nozzle feed feature.

Continuing to refer to FIG. 7, cooling medium 56 is distributed into annular volume 50 through multiple openings/nozzles 180 arranged circumferentially around the inner sleeve 160 (as shown In FIG. 8) which allow cooling medium 56 to exit annular chamber 154 and be directed into the annular volume 50 from the outlet end of the interior of inner sleeve 160. Nozzles 180 are apertures bored from the outer diameter 158 of inner distribution sleeve 160 to the inner bore 164. As in other embodiments, annular volume 50 is created by the radial distance between rotor shaft 36 and gearbox output shaft 30. Cooling medium 56 will exit nozzles 180 and pass between the outer diameter 52 of gearbox output shaft 30 and the inner bore 164 of inner distribution sleeve 160. The nozzles 180 may be arranged or designed in various ways to influence the turbulence of flow of cooling medium 56 to further improve heat transfer from rotor shaft 36 into cooling medium 56. As described in previous embodiments, cooling medium 56 will continue towards outlet 64 and return to the gearbox sump to be recirculated.

FIG. 8 is a detailed view of inner distribution sleeve 160 of the third embodiment. Nozzles 180 can be seen with openings intersecting outer diameter 158 to allow cooling medium 56 to pass interior cavity and ultimately into annular volume 50. A portion of the extents of annular chamber 154 can be seen with outer diameter 158 and sealing elements 156A and 156B. Bias element 168 (FIG. 9) applies force on shoulder 170 extending from outer diameter 58 and radially outward to sealing element 156A. Slots 182 are one half of anti-rotation feature 166 which will receive a tab 184 of housing 152 (FIG. 9).

Figure 9:
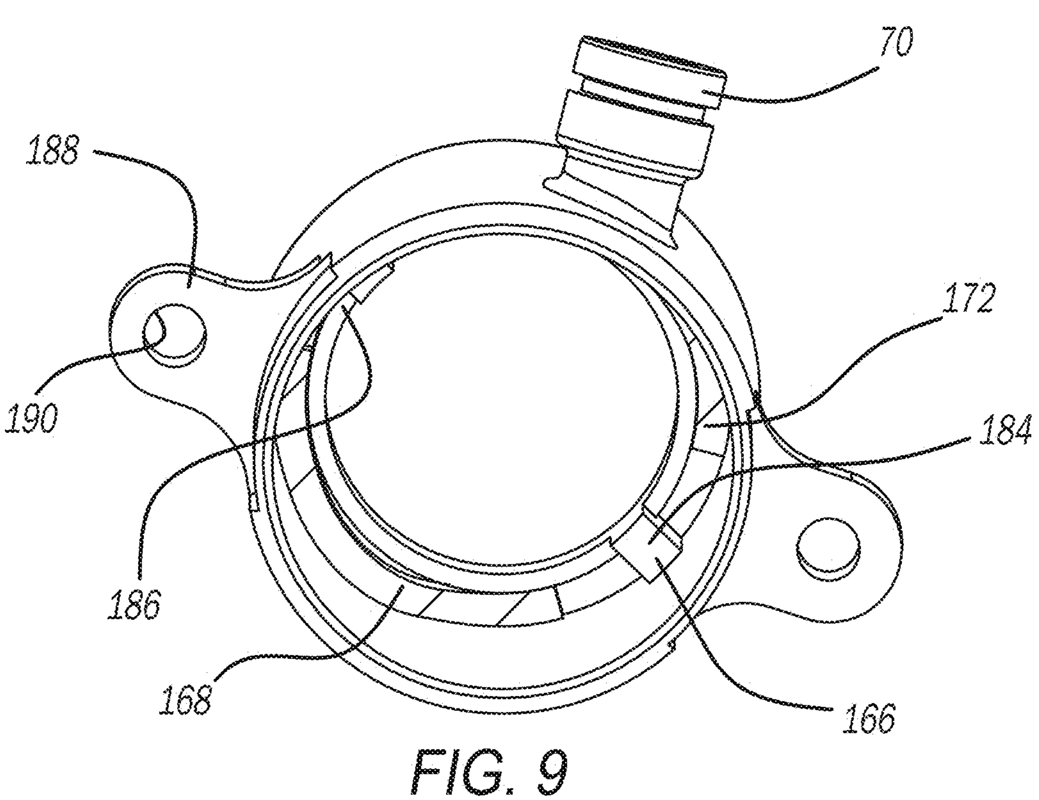
FIG. 9 is an end view of the third embodiment outer distribution housing.

Now turning attention to FIG. 9, an end view of outer distribution housing 150, where tab 184 of anti-rotation feature 166 is better seen. Tab 184 extends from wall 186 of spring pocket 172 of outer distribution housing 150 to ensure no relative rotation will occur between inner distribution sleeve 160 and outer distribution housing 152 when assembled. Tab 184 will mate with slot 182 of inner distribution sleeve 160. Bias element 168, in this case an arc like portion of a wave spring is positioned in spring pocket 172. Mounting ears 188 along with bores 190 to receive a fastener (not shown) are utilized to position the outer distribution housing 152 in to either bearing retainer 27 or cover 28. This ensures outer distribution housing 152 and therefore inner distribution sleeve 160 are well located relative gearbox output shaft 30 and rotor shaft 36 for proper functionality.

Figure 10:
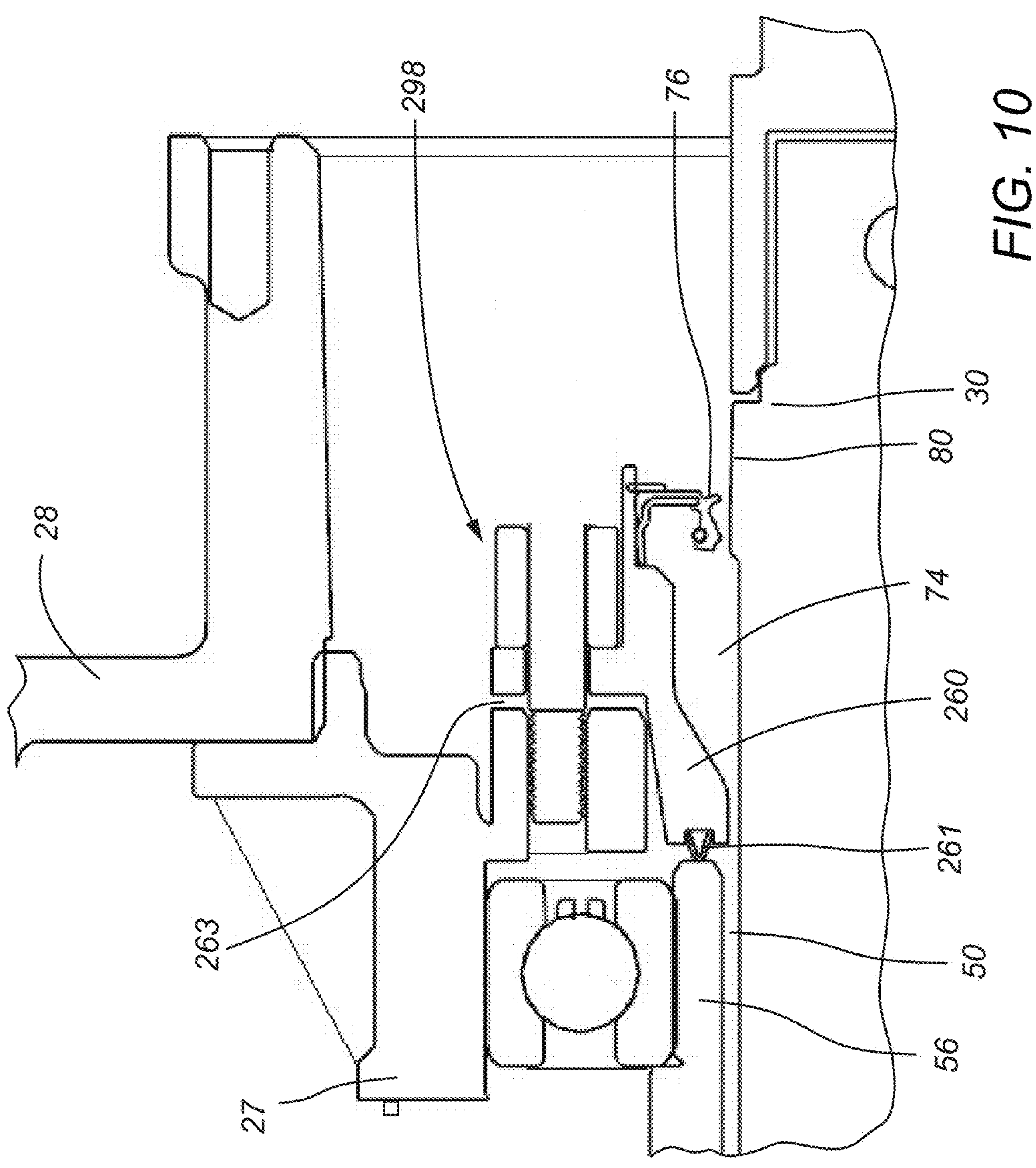
FIG. 10 is a cross sectional view including a fourth embodiment of the distribution housing in a sealing arrangement with the rotor shaft.
Figures 11, 12:
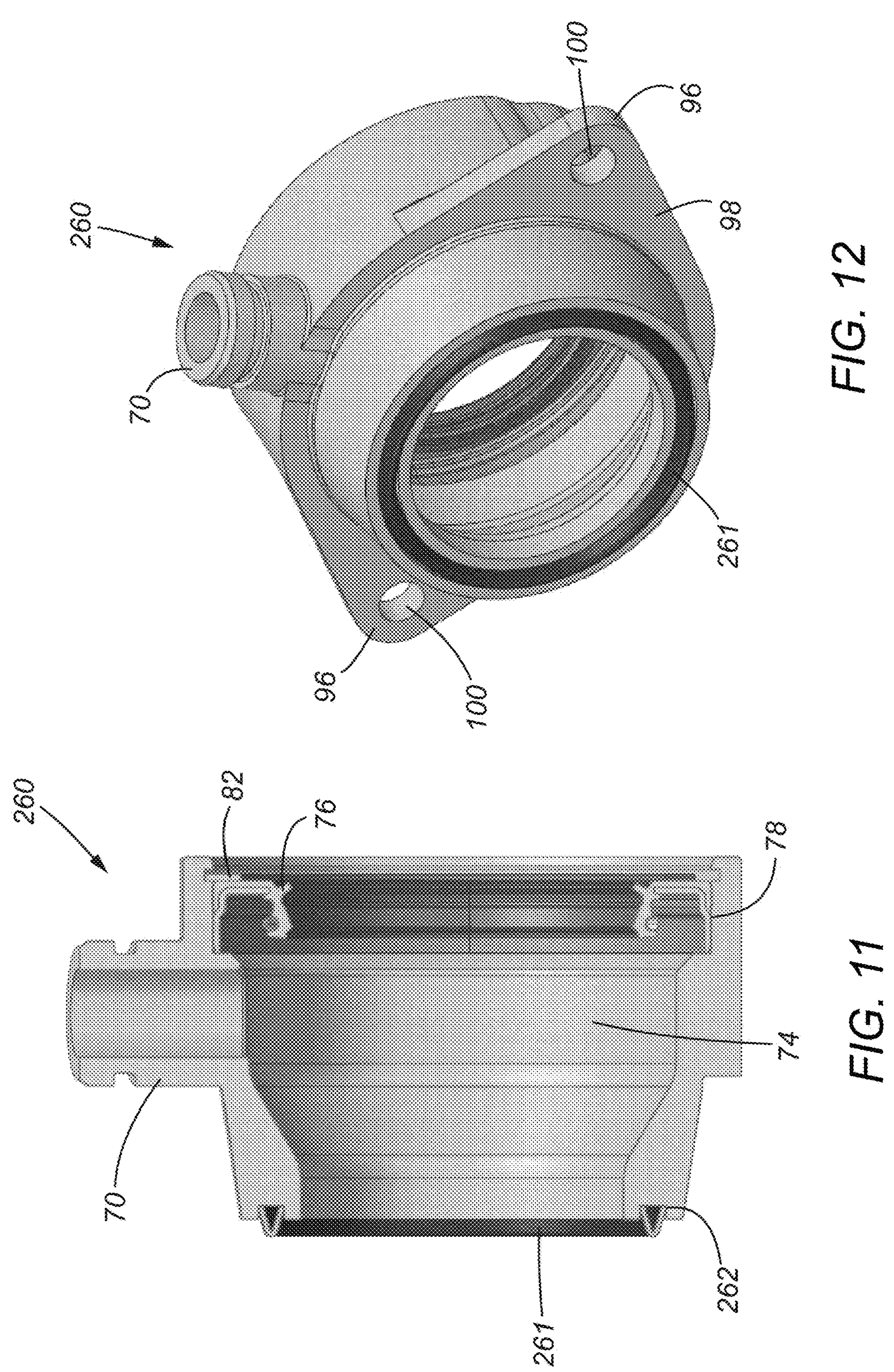
FIG. 11 is a cross-sectional view of the fourth embodiment of the distribution housing, illustrating a v-shaped annular seal.
FIG. 12 is a perspective view of the fourth embodiment of the distribution housing.

In another aspect, and with reference to FIGS. 10-12, an alternative embodiment of a distribution housing 260 is illustrated, which includes an annular seal 261 configured to face the rotor shaft 36. The distribution housing 260 is generally similar to distribution housing 60, and various aspects of the distribution housing 60 are likewise applicable to the distribution housing 260. For instance, distribution housing 260 may also include inlet 70 to provide the cooling medium 56 in a similar manner.

The annular seal 261 is arranged on the face of the distribution housing 260 that faces the rotor shaft 56, such that the seal 261 will prevent or otherwise substantially limit leakage between the distribution housing 260 and the rotor, thereby conveying the cooling medium into the annular volume 50 that is defined between the rotor 36 and the gearbox output shaft 30 (see FIG. 2).

The distribution housing 260 differs from distribution housing 60 in that it does not include the extension lip 90 that is included on distribution housing 60. Instead of using the extension lip 90 and its interface with the internal diameter of the rotor shaft 36 to prevent leakage between the housing 60 and the rotor shaft 36, the sealing is provided by the annular seal 261.

Similar to distribution housing 60, the distribution housing 260 includes inner chamber 74 that receives the cooling medium 56. Chamber 74 is sealed via a lip seal 76 which is pressed into bore 78 of distribution housing 260. Lip seal 76 seals against a journal surface 80 of gearbox output shaft 30. A snap ring 82 retains seal 76 into bore 78 and controls its axial position.

Like distribution housing 60, the distribution housing 260 includes mounting flanges 96, extending from outer edge of distribution housing 60, which provides a mounting face 98 and through holes 100 to pass a fastener 298 to fix distribution housing 20 to bearing retainer 27 from the back of the flange 96 as oriented. These features ensure positional alignment and concentricity with the rotor shaft 36 and gearbox output shaft 30.

When mounted, the distribution housing 260 compresses the annular seal 261 into engagement with the end face of the rotor shaft 36. The rotor shaft 36 is supported on the bearings disposed within the bearing housing 27, and rotates relative to the bearing housing 27 and distribution housing 260, which remain rotationally fixed.

The annular seal 261 is arranged having a V-shaped cross-section, with the narrow end of the V-shape contacting the end face of the rotor shaft 36. The wide end of the V-shape is retained against the face of the distribution housing 260. The face of the distribution housing 260 may include an annular recess 262 or cavity formed thereon, such that the base of the V-shape will be retained within the recess 262.

When attached to the bearing housing 27, the annular seal 261 is compressed against the end face of the rotor shaft 36 depending on the various tolerances that are common in manufacturing and assembly. Accordingly, the amount of compression, and therefore the degree of sealing and the amount of friction, may vary slightly depending on these tolerances. When compressed a greater amount, the sealing force is increased, but the frictional force is increased. When compressed a smaller amount, the frictional force may decrease, but the sealing aspects may be reduced.

As described above, the distribution housing 260 may be fixed to the bearing retainer 27. However, it will be appreciated that other assemblies may be used that do not include a bearing retainer. In such cases, the distribution housing 260 may be fixed to any other rotationally fixed structure, such that the distribution housing 260 remains in place.

In one aspect, the pre-load on the seal 261 may be based on the standard tolerance stackup of the assembled components. Thus, a range of pre-load providing an appropriate sealing range may be provided, such that leakage is prevent within these tolerance ranges. Even in the case of over-compression that may result from ensuring sealing at the opposite end of the spectrum, the worst case condition is simply a higher drag coefficient and increased friction, which can be overcome by the motor torque.

In another approach, to ensure an appropriate amount of sealing, the distribution housing 260 may be attached to the bearing housing 27 along with an adjustment element 263 disposed between the flanges 96 and the bearing housing 27. The adjustment element 263 may be used to space the face of the distribution housing 260 away from the bearing housing 27 a greater amount, which will cause the seal 261 to compress at a smaller amount. The size of the adjustment element may be based on measurements taken at the time of the assembly.

Thus, the annular seal 261 may be nominally sized such that without the adjustment element 263, the annular seal 261 will be over-compressed, taking into the account the potential tolerance buildup. In this instance, the adjustment element 263 (having a desired thickness to reduce the compression) may be added to fine-tune the amount of compression, sealing, and friction. In the event the annular seal 261 remains over-compressed after the addition of the adjustment element, this will still be acceptable, as sealing will still be maintained, and the added friction can be overcome by increased torque of the motor.

In yet another aspect, a compressible element, such as a wave spring 264 (or other resilient compressible member) may be provided in a manner similar to the adjustment element 263. The wave spring 264 is indicated in FIG. 10 at the same location as the adjustment element 263. In this aspect, the fasteners 298 may be torqued to a pre-defined target value to provide a pre-defined target pressure via calculation. Alternatively, the target pressure may be achieved during assembly based on drag measurements following the assembly of the components and end-of-line testing.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varies in many ways. Such variations are not to be regarded as a departure from the disclosure, and all such modifications are intended to be included within the scope of disclosure.

What is claimed is:

1. An electric drive module including an electric motor coaxially arranged with an output of a gearbox, the electric drive module comprising:

the electric motor having a rotor, the rotor being hollow and rotatable relative to a motor housing and a stator of the electric motor;

the gearbox having an output shaft concentric with the rotor and disposed radially within the hollow rotor;

an annular volume formed radially between the hollow rotor and the gearbox output shaft;

a cooling medium distributed through the electric drive module, wherein the cooling medium flows through the annular volume and transfers heat away from the electric motor via contact with the hollow rotor;

a distribution housing that receives the cooling medium during distribution thereof, wherein the distribution housing directs the cooling medium from an inlet of the distribution housing and into the annular volume;

wherein the distribution housing is coaxial with the rotor and the output shaft, and wherein the distribution housing is mounted to a structure of the electric motor, wherein the structure of the electric motor also provides locating features to the output shaft and the rotor to provide proper alignment of the distribution housing with the output shaft and the rotor, thereby minimizing fluid and drag losses;

wherein the distribution housing is fixed relative to the motor housing and includes an annular chamber therein that is in fluid communication with the inlet, the annular chamber further in fluid communication with the annular volume, wherein the hollow rotor rotates relative to the distribution housing;

wherein the distribution housing includes an annular seal on a face of the distribution housing facing an end face of the hollow rotor, wherein the annular seal is compressed against the end face of the hollow rotor, and the hollow rotor rotates relative to the annular seal.

2. The electric drive module of claim 1, wherein a lip seal is disposed within a bore of the distribution housing adjacent the annular chamber and opposite from the annular seal, wherein the lip seal is in sealing engagement with the output shaft, which is rotatable relative to the lip seal and the distribution housing, wherein the lip seal combines with the distribution housing to define the annular chamber around the output shaft.

3. The electric drive module of claim 1, wherein the distribution housing includes an internal conical surface that reduces a cross-sectional area of the flow path of the cooling medium along the path between the annular chamber and the annular volume.

4. The electric drive module of claim 1, wherein the annular seal has a v-shaped cross-section.

5. The electric drive module of claim 1, wherein the distribution housing includes an annular recess formed on an outer face thereof that faces the rotor shaft, wherein a base of the annular seal is retained within the annular recess.

6. The electric drive module of claim 1, wherein the distribution housing is fixedly attached to a bearing housing, wherein the rotor shaft rotates relative to the bearing housing and the distribution housing.

7. The electric drive module of claim 6, wherein an adjustment element is disposed between the distribution housing and the hearing housing, wherein the adjustment element adjusts an amount that the annular seal is compressed based on the thickness of the adjustment element.

8. A method of providing cooling medium within an electric drive module according to claim 1, the method comprising the steps of:

introducing cooling medium via the inlet into the distribution housing;

directing the cooling medium from the distribution housing into and through the annular volume away from the distribution housing and toward the gearbox;

rotating the rotor relative to the distribution housing;

rotating the output shaft relative to the rotor;

transferring heat from the rotor to the cooling medium being directed through the annular volume; and cooling the rotor.

9. An electric drive module including an electric motor coaxially arranged with an output of a gearbox the electric drive module comprising:

the electric motor having a rotor, the rotor being hollow and rotatable relative to a motor housing and a stator of the electric motor;

the gearbox having an output shaft concentric with the rotor and disposed radially within the hollow rotor;

an annular volume formed radially between the hollow rotor and the gearbox output shaft;

a cooling medium distributed through the electric drive module, wherein the cooling medium flows through the annular volume and transfers heat away from the electric motor via contact with the hollow rotor;

a distribution housing that receives the cooling medium during distribution thereof, wherein the distribution housing directs the cooling medium from an inlet of the distribution housing and into the annular volume;

wherein the distribution housing is coaxial with the rotor and the output shaft, and wherein the distribution housing is mounted to a structure of the electric motor, wherein the structure of the electric motor also provides locating features to the output shaft and the rotor to provide proper alignment of the distribution housing with the output shaft and the rotor, thereby minimizing fluid and drag losses;

wherein the distribution housing is fixed relative to the motor housing and includes an annular chamber therein that is in fluid communication with the inlet, the annular chamber further in fluid communication with the annular volume, wherein the hollow rotor rotates relative to the distribution housing;

wherein the distribution housing extends into the annular volume, wherein a passageway is defined radially between distribution housing and the output shaft;

wherein the distribution housing includes an extension lip extending into the annular volume, and the extension lip defines the passageway, the passageway being an annular passageway extending from the annular chamber to the annular volume.

10. The electric drive module of claim 9, wherein a clearance is defined radially between the extension lip and the hollow rotor.

11. The electric drive module of claim 10, wherein the distribution housing is a unitary piece including the extension lip.

12. A method of providing cooling medium within an electric drive module according to claim 9, the method comprising the steps of:

introducing cooling medium via the inlet into the distribution housing;

directing the cooling medium from the distribution housing into and through the annular volume away from the distribution housing and toward the gearbox;

rotating the rotor relative to the distribution housing;

rotating the output shaft relative to the rotor;

transferring heat from the rotor to the cooling medium being directed through the annular volume; and cooling the rotor.

13. An electric drive module including an electric motor coaxially arranged with an output of a gearbox, the electric drive module comprising:

the electric motor having a rotor, the rotor being hollow and rotatable relative to a motor housing and a stator of the electric motor;

the gearbox having an output shaft concentric with the rotor and disposed radially within the hollow rotor;

an annular volume formed radially between the hollow rotor and the gearbox output shaft;

a cooling medium distributed through the electric drive module, wherein the cooling medium flows through the annular volume and transfers heat away from the electric motor via contact with the hollow rotor;

a distribution housing that receives the cooling medium during distribution thereof, wherein the distribution housing directs the cooling medium from an inlet of the distribution housing and into the annular volume;

wherein the distribution housing is coaxial with the rotor and the output shaft, and wherein the distribution housing is mounted to a structure of the electric motor, wherein the structure of the electric motor also provides locating features to the output shaft and the rotor to provide proper alignment of the distribution housing with the output shaft and the rotor, thereby minimizing fluid and drag losses;

wherein the distribution housing is fixed relative to the motor housing and includes an annular chamber therein that is in fluid communication with the inlet, the annular chamber further in fluid communication with the annular volume, wherein the hollow rotor rotates relative to the distribution housing;

wherein the distribution housing includes an outer distribution housing fixed relative to the motor housing and an inner distribution sleeve disposed within the outer distribution housing and which provides a seal against the outer distribution housing on opposite axial sides of the inlet.

14. The electric drive module of claim 13, wherein the inner distribution sleeve includes a pair of annular seals axially offset relative to each other, wherein the seals contact the fixed outer distribution housing and define the annular chamber therebetween, wherein the seals rotate relative to the fixed outer distribution housing during rotation of the output shaft.

15. The electric drive module of claim 13, wherein the inner distribution sleeve includes a plurality of turbine members disposed on an inner surface thereof, wherein the turbine members combine with an outer surface of the output shaft to define a plurality of channels, wherein the turbine members receive the cooling medium from the annular chamber and direct the cooling medium through the channels and to the annular chamber, wherein the inner distribution sleeve is supported on the outer surface of the output shaft along an axial length of the inner distribution sleeve.

16. The electric drive module of claim 13, wherein the inner distribution sleeve is disposed radially between the hollow rotor and the output shaft and rotates along with the output shaft relative to the hollow rotor.

17. The electric drive module of claim 13, wherein the inner distribution sleeve is rotationally fixed relative to the outer distribution housing, wherein the output shaft and hollow rotor are each rotatable relative to the inner distribution sleeve.

18. The electric drive module of claim 17, wherein an inner bore of the inner distribution sleeve is fitted via a journal on the output shaft, wherein the inner bore and an outer surface of the output shaft define an annular passageway axially adjacent the journal, wherein an outlet end of the annular passageway is in fluid communication with the annular volume;

wherein the inner distribution sleeve includes a pair of axially spaced seal members that are in contact with an inner bore of the outer distribution housing, wherein the seal members define the annular chamber axially therebetween, wherein the inner distribution sleeve includes a plurality of apertures circumferentially arranged around the inner distribution sleeve, wherein the apertures define nozzles through the inner distribution sleeve, wherein the nozzles provide fluid communication from the annular chamber to the annular passageway;

wherein the inner distribution sleeve and the outer distribution housing are rotationally coupled via an anti-rotation feature, wherein the anti-rotation feature permits axial movement of the inner distribution sleeve relative to the outer distribution housing;

wherein a biasing element is disposed axially between the inner distribution sleeve and outer distribution housing within the outer distribution housing, wherein the biasing element biases the inner distribution sleeve out of the outer distribution housing and into axial engagement with an axial end of the hollow rotor;

wherein the inner distribution sleeve does not extend into the annular volume, wherein a conical face of the inner distribution sleeve contacts a chamfer surface of the hollow rotor at the axial end of the hollow rotor, wherein the annular volume extends axially away from the chamfer surface and the conical face.

19. A method of providing cooling medium within an electric drive module according to claim 13, the method comprising the steps of:

introducing cooling medium via the inlet into the distribution housing;

directing the cooling medium from the distribution housing into and through the annular volume away from the distribution housing and toward the gearbox;

rotating the rotor relative to the distribution housing;

rotating the output shaft relative to the rotor;

transferring heat from the rotor to the cooling medium being directed through the annular volume; and cooling the rotor.

* * * * *